JOHN C. STILES
INVENTOR.

JOHN C. STILES
INVENTOR.

BY S. A. Giarratana
Francis L. Masselle
ATTORNEYS

United States Patent Office 3,225,609
Patented Dec. 28, 1965

3,225,609
TWO-AXIS GYROSCOPE
John C. Stiles, Morristown, N.J., assignor to General Precision, Inc., Little Falls, N.J., a corporation of Delaware
Filed Dec. 14, 1962, Ser. No. 244,670
2 Claims. (Cl. 74—5.7)

The present invention relates to gyroscopes, and more particularly to a two-axis gyroscope having an inertia wheel which is free to precess about any diameter thereof as it rotates.

Prior to the present invention a typical two-axis gyro had an inertia wheel rotatably mounted in a spin motor housing and the housing in turn, was journalled by suitable gimbal bearings in a manner to enable the housing to precess about any axis perpendicular to the spin axis of the wheel. With this construction steady gimbal bearing torques were present which affected the operation of the gyro and caused drift.

In accordance with one embodiment of the present invention the disadvantages of this prior construction are overcome by providing a gyro comprising a shaft rotatably driven by a synchronous motor at one end thereof with a universal joint mounted on the other end thereof. An inertia wheel is connected to the shaft by the universal joint for rotation about a spin axis normally defined by the shaft. However, because of the universal joint action, the wheel is free to precess about any diameter of the wheel so that its spin axis does not necessarily coincide with the shaft spin axis. In operation, the wheel will tend to remain stationary in space because of its gyroscopic moment, and the angle between the wheel and the gyro housing can be detected by a suitable pick-off. If the gyro housing is mounted on a platform with gimbals, this pickoff signal can be used to keep the platform stationary with respect to the wheel and hence with inertia space.

The advantages of this construction are (1) since the gyro is sensitive to angular displacements about any diameter thereof, it is a two-axis gyro and can replace two conventional single axis gyros; (2) fixed torques exerted on the wheel by the universal joint suspension average out over each revolution of the wheel and, therefore, unlike conventional ball bearing supported gyros, steady ball bearing torques do not affect the operation and do not cause drift; (3) the shaft and spin motor bearings can be mounted outside the gyroscopic portion of the device so that the gyro performance will not be affected by wear. Accordingly, the gyro will have an extended life and improved mass balance stability over conventional gyros since the requirement for heavy pre-load in the shaft bearings no longer exists and provision can be made for large amounts of lubrication without affecting the wheel balance.

Accordingly, it is one object of the invention to provide an improved two-axis gyro having an inertia wheel which is free to precess about any diameter thereof.

It is another object of the invention to provide a two-axis gyro which eliminates steady ball bearing torques affecting the operation of the gyro and causing drift.

It is a further object of the invention to provide a two-axis gyro having an inertia wheel connected to a rotating shaft by a universal joint so that the wheel is free to precess about any diameter thereof.

It is a still further object of the invention to provide a simple two-axis gyro suitable for use in attitude-indicating platforms or inexpensive inertial systems which is less expensive and has a higher accuracy than conventional ball bearing supported gyros normally used for such applications.

Further objects and advantages of the present invention will be specifically pointed out or will otherwise become apparent when referring, for a better understanding of the invention, to the following description taken in conjunction with the accompanying drawings, wherein.

Figure 1:
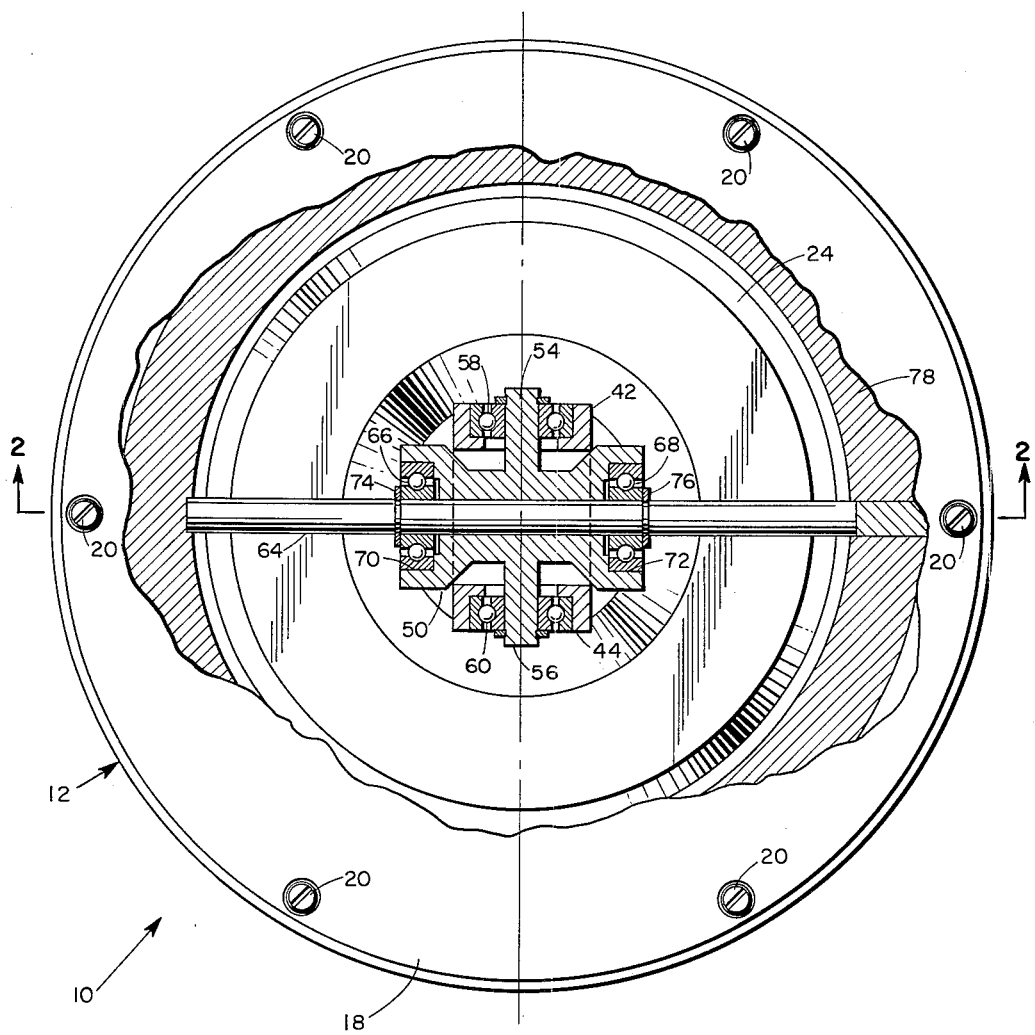
FIG. 1 is a plan view, partially broken away, of one embodiment of the invention.
Figure 2:
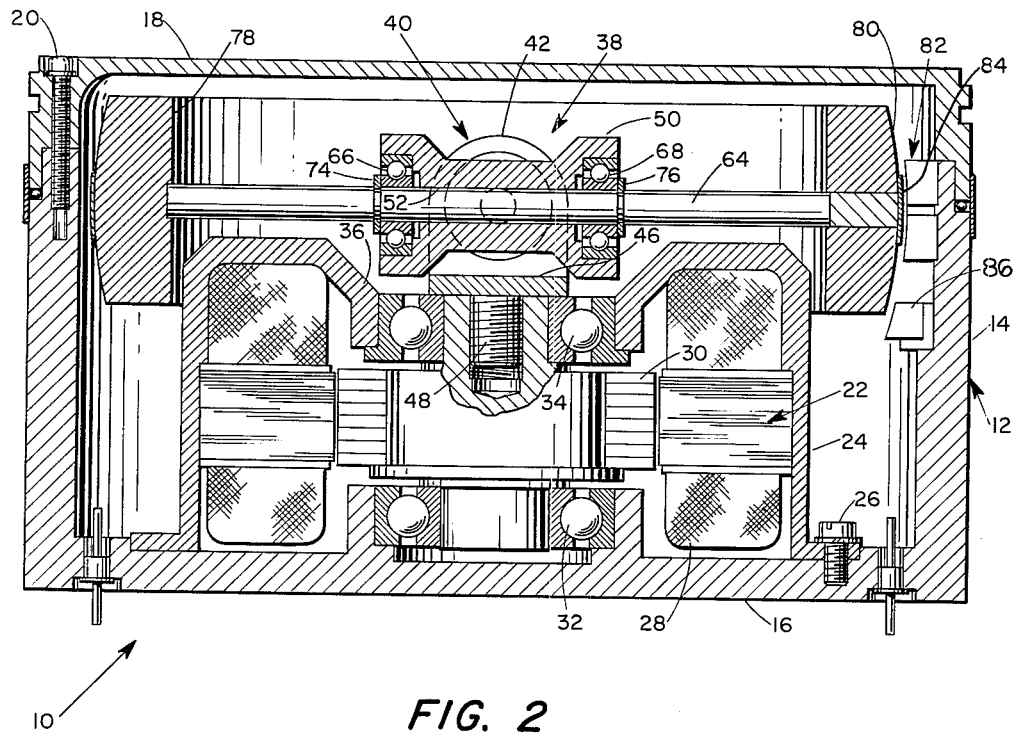
FIG. 2 is a sectional view taken along line 2—2 of FIG. 1.

Referring to FIGS. 1 and 2, a gyroscope 10 is shown which illustrates one embodiment of the present invention. It comprises a housing 12 having a cylindrical side wall 14, a bottom wall 16 and a removable top wall 18 secured to the cylindrical wall 14 by a plurality of bolts 20. A spin motor 22 is positioned within the housing 12 and comprises a frame 24 bolted to the bottom wall 16 by a plurality of bolts 26. A stator 28 is fixed within the frame 24 and a rotor 30 is mounted for rotation within the stator by ball bearings 32 and 34. The outer race of the lower ball bearing 32 is fixed to the bottom wall 16 of the housing and the outer race of the upper ball bearing 34 is fixed to an annular supporting flange 36 provided by the frame 24.

A universal joint 38 is fixed to the upper end of the rotor 30 for rotation therewith and comprises a U-shaped clevis 40 having spaced side plates 42 and 44 interconnected by a bottom plate 46 having a stub shaft 48 projecting downwardly therefrom into the rotor 30. A pivot element 50 having a central bore 52 extending therethrough along one orthogonal axis and a pair of stub shafts 54 and 56 projecting from opposite sides thereof along the other orthogonal axis is pivotally supported between the side plates 42 and 44 of the clevis by ball bearings 58 and 60. The inner races of the ball bearings are fixed to the stub shafts 54 and 56 and the outer races of the ball bearings are fixed to the side plates 42 and 44.

A shaft 64 extends through the central bore 52 and is rotatably journalled therein by ball bearings 66 and 68 having the outer races thereof seated within counterbores 70 and 72 in the pivot element. The inner races of the ball bearings are fixed to the shaft 64 and suitable snap rings 74 and 76 are fixed to the shaft outwardly of each of the ball bearings 66 and 68 to fix the shaft against axial movement.

An inertia wheel 78 is supported on the ends of the shaft 64 so that it rotates with the universal joint 38 and the rotor 30. The wheel 78 has a truncated spherical outer surface 80 having a center of curvature coinciding with the juncture of the two orthogonal axes defined by the central bore 52 and the stub shafts 54 and 56 of the universal joint. With this construction, the rotating inertia wheel 78 will tend to remain stationary in space because of its gyroscopic moment when it is rotated at a high angular velocity. Since the universal joint which enables the wheel to precess is coaxially spaced from the rotor bearings 32 and 34, the gyro performance will not be affected by wear of the rotor bearings. Accordingly, the gyro will have an extended life and improved mass balance stability over conventional gyros since the requirement for heavy pre-load in the bearings 32 and 34 no longer exists and provision can be made for large amounts of lubrication for these bearings without affecting the wheel balance. Further, the fixed torques exerted on the wheel by the universal joint suspension average out over each revolution of the wheel and, therefore, unlike conventional ball bearing supported gyros, steady ball bearing torques do not affect the operation of the gyro and do not cause drift.

The angle between the wheel and the gyro housing 12 can be detected by a suitable pickoff 82 and if the gyro is mounted on a platform with gimbals, the pickoff signal can be used to keep the platform stationary with respect to the inertial wheel and hence with respect to inertial space.

In the particular embodiment illustrated in FIG. 2, the pickoff 82 is a conventional E-bridge pickoff having three poles fixed to the cylindrical wall 14 of the housing so as to be symmetrically positioned with respect to the equator of the truncated spherical surface 80. The poles of the pickoff coact with a magnetic metal band 84 girdling the equator of wheel 78 which serves to bridge the flux gap between the center and the respective outer poles. When band 84 is symmetrically disposed with respect to the poles of pickoff 82, the magnetic circuits balance to create a null condition; any angular displacement of wheel 78 about the common (co-linear) axes of stub shafts 54, 56 upsets the null and is indicated by an output signal from the pickoff.

Conventional electrostatic torquers are provided (one shown at 86) adjacent the periphery of wheel 78 operable to exert a torquing force on the wheel about the axes of stub shafts 54, 56 (FIG. 1). In practice, a plurality of torquers 86 are placed so as to overlie both the upper and lower edges of wheel 78 at diametrically opposed points. The configuration, function and inter-relation between the torquers and pickoffs is conventional and well-known in the art.

Figure 3:
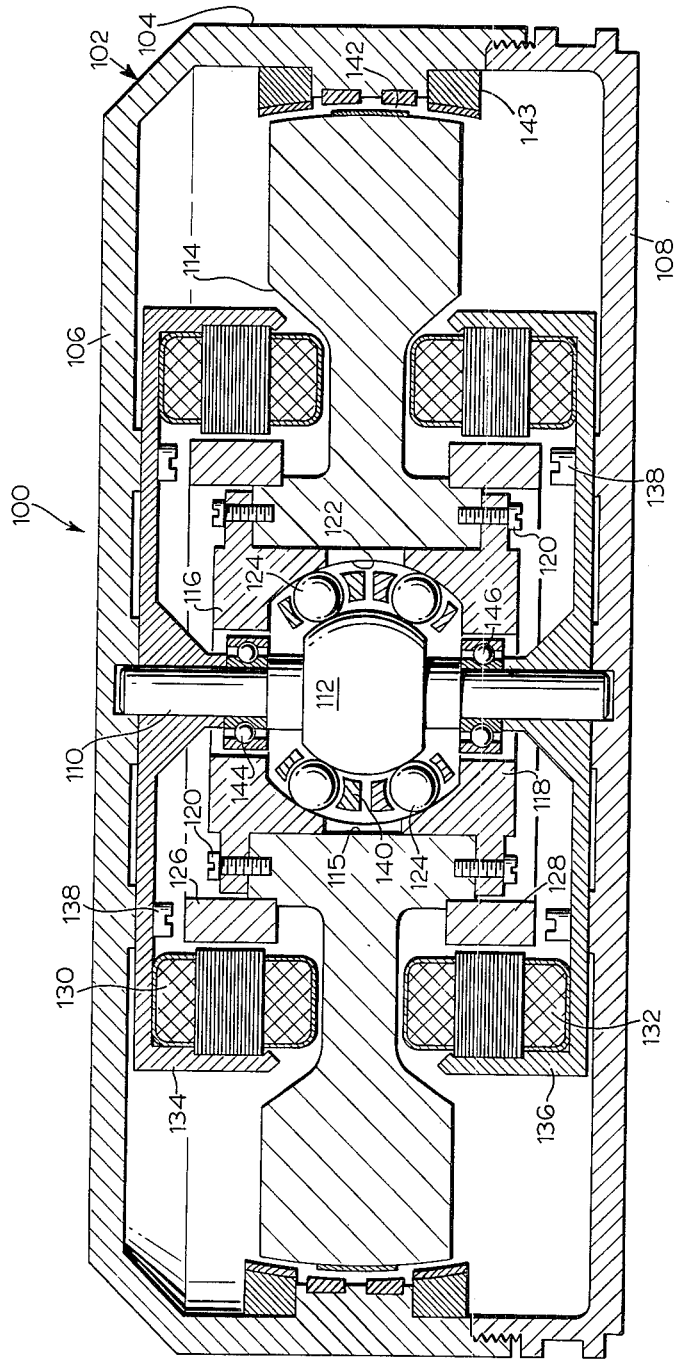
FIG. 3 is a sectional view similar to FIG. 2, illustrating another embodiment of the invention.

Referring to FIG. 3, a gyroscope 100 is shown which illustrates another embodiment of the present invention. It comprises a housing 102 having a cylindrical side wall 104, an integral top wall 106 and a removable bottom wall 108. A shaft 110 having an enlarged spherical portion 112 formed between the ends thereof is fixed between the top and bottom walls 106 and 108 along the axis of the housing.

An inertia wheel 114 having a central opening 115 therein is positioned about the spherical portion 112. A pair of outer race members 116 and 118 are bolted to the wheel 114 by a plurality of bolts 120 and cooperate with one another to define a spherical cavity 122 within the opening 115 concentric with the spherical portion 112. A plurality of balls 124 are positioned between the outer race members 116 and 118 and the spherical portion 112 to form a universal joint, or more specifically a spherical ball bearing, for rotatably mounting the inertia wheel 114 on the shaft 110 in a manner to enable the wheel to precess about any diameter thereof. The wheel 114 is rotatably driven by a hysteresis synchronous motor comprising a pair of rotors 126 and 128 fixed to the wheel 114 on opposite sides thereof and a pair of stators 130 and 132 fixed to frame members 134 and 136 which, in turn, are bolted to the top and bottom walls 106 and 108 of the housing by a plurality of bolts 138.

The balls 124 are maintained in proper spaced relation by a suitable lubricated phenolic retainer and separator 140 which also prevents the balls from escaping from the spherical bearing. However, when the inertia wheel 114 is rotated by the motor, the balls 124 are driven by centrifugal force towards the plane of rotation of the wheel so that there is no tendency for them to escape from the spherical bearing during rotation. The spherical bearing construction allows the inertia wheel to be rotated at a high angular velocity and also allows it to precess about any diameter. Suitable pickoffs 142 and torquers 143 which may be the same as counterparts 82 and 86, FIG. 2, are positioned adjacent to the periphery of the wheel to determine the angle between the wheel and the housing and to exert control torques on the wheel. Ball bearings 144 and 146 are fixed to the shaft on either side of the spherical portion 112 in position to be engaged by the peripheries of the outer race members 116 and 118 to limit the angular displacement of the wheel 114 without introducing friction to impede the rotation of the wheel.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, a drag cup motor may be substituted for the hysteresis synchronous motor illustrated in the embodiment of FIG. 3 to eliminate magnetic forces on the inertia wheel.

What is claimed is:
1. A two-axis gyroscope comprising:
   a discoid housing;
   a shaft coaxially disposed and fixed within said housing;
   a globular bearing surface on said shaft intermediate its ends;
   an inertial wheel coaxially disposed within said housing and having a hub portion surrounding said globular bearing surface;
   means defining a spherical bearing surface on the interior of said hub portion complementary to, and radially spaced from, said globular bearing surface;
   ball bearing members, disposed and retained between said bearing surfaces, rotatably mounting said wheel on said shaft;
   coaxial hysteresis rings on said hub portion adjacent the respective ends thereof;
   stator windings circumscribing said hysteresis rings and fixedly secured to said housing; and
   signal pickoff and torquer means having coacting component parts mounted on the circumferential surface of said wheel and an adjacent, circumscribing portion of said housing.

2. A two-axis gyroscope comprising:
   an enclosed discoid housing made up of a cup-shaped member and a removable end-cover member;
   a shaft coaxially disposed in said housing with its ends fixedly supported in the end walls thereof;
   a globular bearing surface on said shaft intermediate its ends;
   an inertial wheel having a hollow cylindrical hub portion, a rim portion and a relatively thin web portion, said wheel being disposed within said housing with its hub portion surrounding said globular bearing surface;
   means defining a spherical bearing surface on the interior of said hub portion complementary to, and radially spaced from, said globular bearing surface;
   ball bearing members disposed and retained between said bearing surfaces in two axially spaced annular arrays concentric with, and rotatably mounting said wheel on, said shaft;
   a pair of coaxial hysteresis rings on said wheel hub portion, each adjacent a respective end thereof;
   annular stator windings on each end of said housing projecting into the recesses defined on opposite sides of the web portion by the hub and rim portions of said wheel, each stator winding closely circumscribing a respective one of said hysteresis rings; and
   signal pickoff and torquer means having coacting component parts mounted on the circumferential surface of said wheel rim portion and an adjacent circumscribing portion of said housing.

References Cited by the Examiner

UNITED STATES PATENTS

| 1,954,998 | 4/1934 | Hoffmann | 74—5.7 X |
| 2,850,905 | 9/1958 | Sedgfield | 74—5.7 |
| 2,948,155 | 8/1960 | Burkham | 74—5.6 |

FOREIGN PATENTS

| 973,072 | 9/1950 | France. |
| 1,138,533 | 1/1957 | France. |

BROUGHTON G. DURHAM, *Primary Examiner.*

T. W. SHEAR, *Assistant Examiner.*